(12) United States Patent
Sreedhar M et al.

(10) Patent No.: US 12,147,589 B2
(45) Date of Patent: Nov. 19, 2024

(54) SECURING SEDS BEHIND A HBA CONTROLLERS WITH A PASSTHROUGH MECHANISM USING BMC

(71) Applicant: Dell Products L.P., Round Rock, TX (US)

(72) Inventors: Deepu Syam Sreedhar M, Calicut (IN); Chandrashekar Nelogal, Round Rock, TX (US); Marcelo S. Saraiva, Austin, TX (US); Sanjeev S. Dambal, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 235 days.

(21) Appl. No.: 17/729,732

(22) Filed: Apr. 26, 2022

(65) Prior Publication Data

US 2023/0342504 A1 Oct. 26, 2023

(51) Int. Cl.
*G06F 21/78* (2013.01)
*G06F 21/71* (2013.01)
*G06F 21/74* (2013.01)
*G06F 21/62* (2013.01)

(52) U.S. Cl.
CPC .................................. *G06F 21/78* (2013.01)

(58) Field of Classification Search
None
See application file for complete search history.

(56) References Cited

U.S. PATENT DOCUMENTS

| 2014/0122852 A1* | 5/2014 | Guo ......................... G06F 9/00 713/1 |
| 2020/0285750 A1* | 9/2020 | Jaeger .................... G06F 21/30 |
| 2023/0120616 A1* | 4/2023 | Preimesberger ...... H04L 9/3247 713/171 |

* cited by examiner

*Primary Examiner* — Venkat Perungavoor
(74) *Attorney, Agent, or Firm* — Chamberlain, Hrdlicka, White, Williams & Aughtry; Aly Dossa

(57) ABSTRACT

In general, embodiments of the invention relate to a method and system for managing a storage system. In many traditional implementations host bus adapter (HBA) manages the storage device, however frequently the HBA cannot implement the necessary methods to secure a self-encrypting drive (SED). One or more embodiments of the invention use a baseboard management controller (BMC) to manage the security of the SEDs as well as the security life cycle of the SEDs, while the HBA acts as a passthrough conduit between the SED and BMC.

20 Claims, 5 Drawing Sheets

SECURING SEDS BEHIND A HBA CONTROLLERS WITH A PASSTHROUGH MECHANISM USING BMC

BACKGROUND

Protecting the sensitive information stored on storage devices is one of the most important things that organizations are focusing on these days. As data stored on drives may contain critical information, it is important that they should be secured in such a way that an adversary cannot steal the data even if they get access to the drives. Often this protection is achieved by using self-encrypting drives (SEDs)

SUMMARY

In general, certain embodiments described herein relate to a method for using a self-encrypting drive (SED). The method includes identifying a drive on a computing device as a SED. The method then unlocks the SED by using a baseboard management controller (BMC). The BMC is on the computing device. Once the SED is unlocked by the BMC, the SED is registered with an operating system that is executed on the computing device.

In general, certain embodiments described herein relate to a system that includes a computing device, a self-encrypting drive (SED), and a baseboard management controller (BMC). The system includes at least one processor and one memory that includes instructions. The instructions, when executed by the at least one processor perform a method for using the SED. The method includes identifying a drive on the computing device as a SED. The method then unlocks the SED by using the BMC. The BMC is part of the computing device. Once the SED is unlocked by the BMC, the SED is registered with an operating system that is executed on the computing device.

In general, certain embodiments described herein relate to a non-transitory computer readable medium that includes computer readable program code. The computer readable program code when executed by a computer processor enables the computer processor to perform a method for using a self-encrypting drive (SED). The method includes identifying a drive on a computing device as a SED. The method then unlocks the SED by using a baseboard management controller (BMC). The BMC is on the computing device. Once the SED is unlocked by the BMC, the SED is registered with an operating system that is executed on the computing device.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
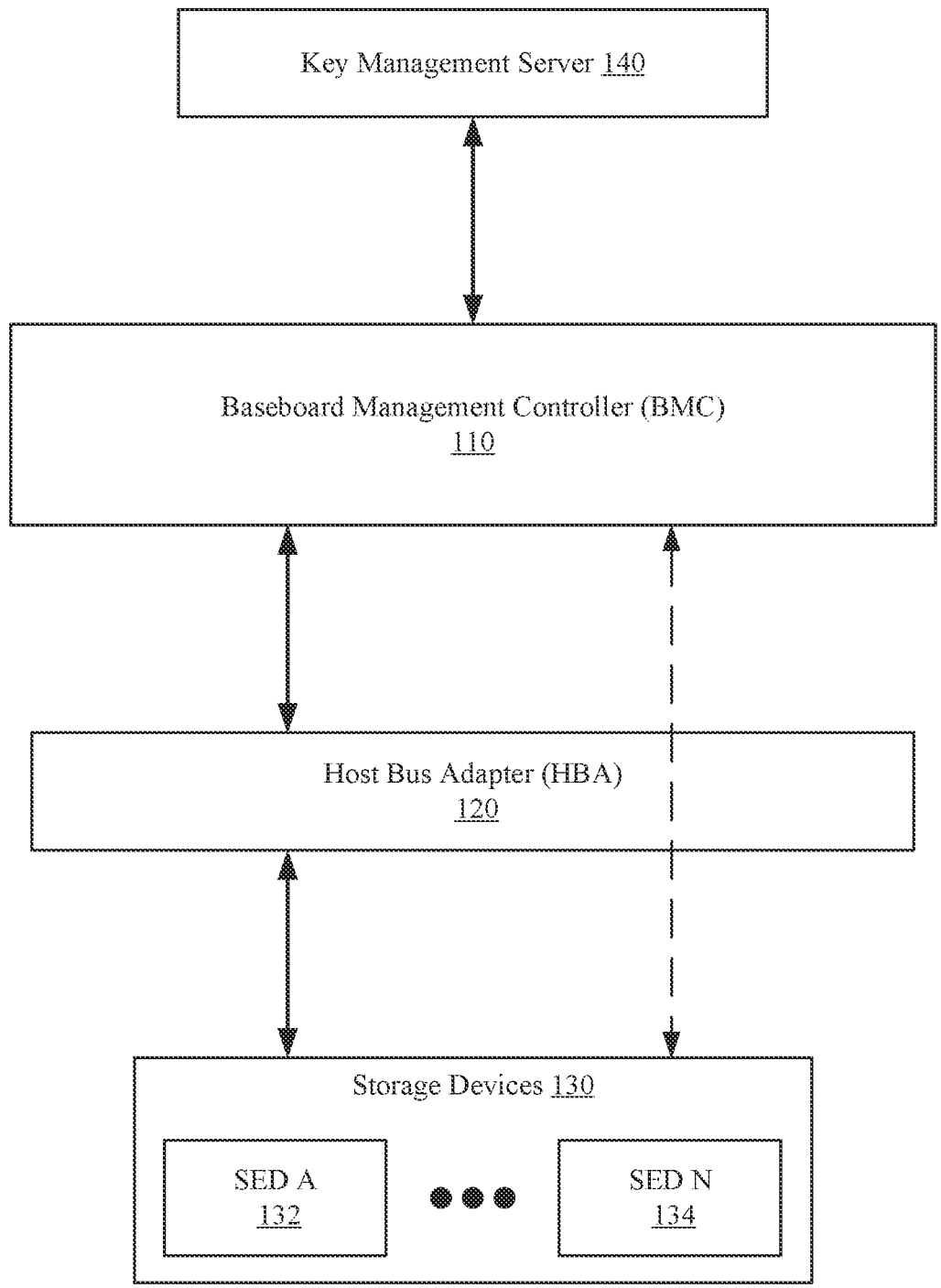
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for managing a storage system. In many traditional implementations, the host bus adapter (HBA) manages the storage device; however, unlike redundant arrays of independent disks (RAID) controller, HBA cannot implement the necessary methods to secure a self-encrypting drive (SED). For such systems, there is a need for an additional agent like a baseboard management controller (BMC) to manage the security of the drives as well as the security life cycle of the SED.

Embodiments of the invention include methods for managing a SED including securing and un-securing it. One or more embodiments of the invention include methods for booting a system, which includes SEDs, using a BMC. One or more embodiments of the invention are also directed to scenarios when a new SED is inserted, such as a hot insertion, as well as to providing the management on the new SED.

FIG. 1 shows a system in accordance with one or more embodiments of the invention. The system includes a key management service (140), a BMC (110), a HBA (120), and one or more storage devices (130). The one or more storage devices (130) can include a plurality of SEDs, e.g., SED A-SED N, (e.g., 132, 134). The system may include additional, fewer, and/or different components without departing from the invention. Each component may be operably connected to any of the other components via any combination of wired and/or wireless connections. Each component can be located in the same device or separately located and connected by a network including, but not limited by, a LAN, WAN, or Internet. Each component illustrated in FIG. 1 is discussed below.

In one or more embodiments of the invention, the system manages the operation of the storage devices (130). Specifically, a BMC (110) through a HBA (120) manages the access to data that may be secured in the SEDs (e.g., 132-134) by initiating unlocking operations and/or security operations on the SEDs (e.g., 132-134). The BMC (110) may utilize resources of other components such as the HBA e.g., 120, and key management service e.g., 140. Other components (not shown) of a system including the BMC (110) and storage devices (130) may be used to implement any portion of the management of the storage devices (130). While the system of FIG. 1 is illustrated as only including one set of storage devices (130), the BMC controller (110) and/or HBA (120) may manage the operation of any number of storage devices and/or systems without departing from the invention.

Continuing with the discussion of FIG. 1, in one or more embodiments of the invention, the storage devices (130) may include functionality for performing self-encryption. Specifically, the storage devices (130) may utilize the storage device keys to encrypt their respective data. As such, the storage devices (130) may be referred to as, for example, self-encrypting devices (SEDs).

The storage devices as illustrated in FIG. 1 only includes SEDs (e.g., 132-134), however, the storage devices (130) of one or more embodiments of the invention can include other types of storage devices including RAID storage devices, unsecured traditional drives, and other types of electronic storage.

The system of FIG. 1 includes a host bus adapter (HBA, e.g., 120) which manages the storage devices (130). The HBA (120) may be part of a device that includes the BMC (110) or may be a separate device. The HBA (120) connects the other parts of the system such as the BMC (110) to the storage devices (130). The HBA (120) can connect to SCSI, Fibre Channel, SATA, SAS, and other types of connections and storage devices. The HBA in general cannot secure connected drives. In accordance with one or more embodiments of the invention, the HBA (120) acts a passthrough to the BMC (110), so that the BMC (110) can secure/unsecure the SEDs connected to the HBA (120) as will be described in more detail with regards to the methods of FIGS. 2A-2C.

In one or more embodiments of the invention, a BMC (110) aids in the management of the security states of the storage devices (130) by managing the generation and/or storage of storage device keys. In one or more embodiments of the invention, the storage device keys are data structures that may be used to encrypt, decrypt, and/or otherwise modify the data in the storage devices (130) to prevent undesired access to the data in the storage devices (130). One storage device key may be used for all storage devices (132, 134) in the system. Alternatively, each storage device (132, 134) may correspond to a unique storage device.

In one or more embodiments of the invention, the data in the storage devices (130) may be encrypted by applying an encryption algorithm on the data using the corresponding storage device key(s). The data may be decrypted using the same storage device key or a decryption key without departing from the invention. Examples of encryption algorithms include but are not limited to data encryption standard (DES), Triple DES, Rivest-Shamir-Adleman (RSA), Blowfish, and Advanced Encryption Standard (AES).

In one or more embodiments of the invention, the keys can be from an external key management server (140), made available to the storage devices using a hardware resource manager. The hardware resource manager may be, for example, a baseboard management controller (BMC e.g., 110), which in turn uses the key(s) to protect the SEDs (e.g., 132-134) connected to it. The protection may be performed using encryption algorithms applied to the data in the SEDs (e.g., 132-134). Alternatively, the key can be from an internal key management server (not shown), which in one or more embodiments of the invention is a part of the BMC (110).

The BMC (110) is a device that controls, and monitors connected devices in a system such as that of FIG. 1. The BMC interacts with the system BIOS as well as the system's operating system (OS). The BMC may take the form of a processor or processors integrated into the main board of a device or may be provided as a separate expansion card and/or as a remote management system. Specifically in one or more embodiments of the invention along with other tasks, the BMC manages the SEDs (e.g., 132-134) in a passthrough manner with the HBA (120).

Embodiments of the invention include a method for protecting the SEDs (e.g., 132-134) behind a host bus adapter (HBA, 120) in a passthrough way, in which the HBA (120) acts as a passthrough conduit for key exchange traffic between a BMC (110) and the SEDs (e.g., 132-134). The BMC (110) can generate keys either locally or remotely using servers, such as the abovementioned key management server (140) that implement key management protocols. In one or more embodiments of the invention, the BMC (110) includes functionality for generating and managing keys locally. In one or more other embodiments of the invention the BMC (110) acts as a key exchange manager that retrieves keys from a key management server (140).

As used herein, the unsecured mode (also referred to as the unsecure mode) of the storage devices (130) refers to a mode of operation of the storage devices (130) in which the storage of data is not secured by the BMC (110) and/or the storage devices (130). Specifically, in the unsecured mode, the BMC (110) is not programmed to ensure the data in the storage devices (130) are encrypted. Such mode may compromise the integrity of the data in the storage devices (130) managed by the BMC (110).

In one or more embodiments of the invention, the BMC (110) manages the security mode of the storage devices (130). The security modes may be initiated by administrative systems (not shown) that manage the operation of the system of FIG. 1 and/or utilize the security management services provided by the BMC (110). In one or more embodiments of the invention, the BMC (110) may include the computing components required to provide the BMC (110) the capability for performing the functionality of a hardware resource manager described throughout the application and/or all, or a portion thereof, of the methods described in FIGS. 2A-2C.

In one or more embodiments of the invention, the system of FIG. 1 provides services to users, e.g., clients (not shown). For example, the services may include the use of the storage devices (130) to store data, read stored data, and/or otherwise access the storage devices (130). Further, the system of FIG. 1 may include services for securing the data stored in the storage devices (130). The management of the security states may be initiated by either the BMC (110) or HBA (120).

While FIG. 1 shows a configuration of components, other configurations may be used without departing from the scope of embodiments described herein. Accordingly, embodiments disclosed herein should not be limited to the configuration of components shown in FIG. 1.

In one or more embodiments of the invention, the system of FIG. 1 is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the system of FIG. 1 described throughout this application.

Figure 2A:
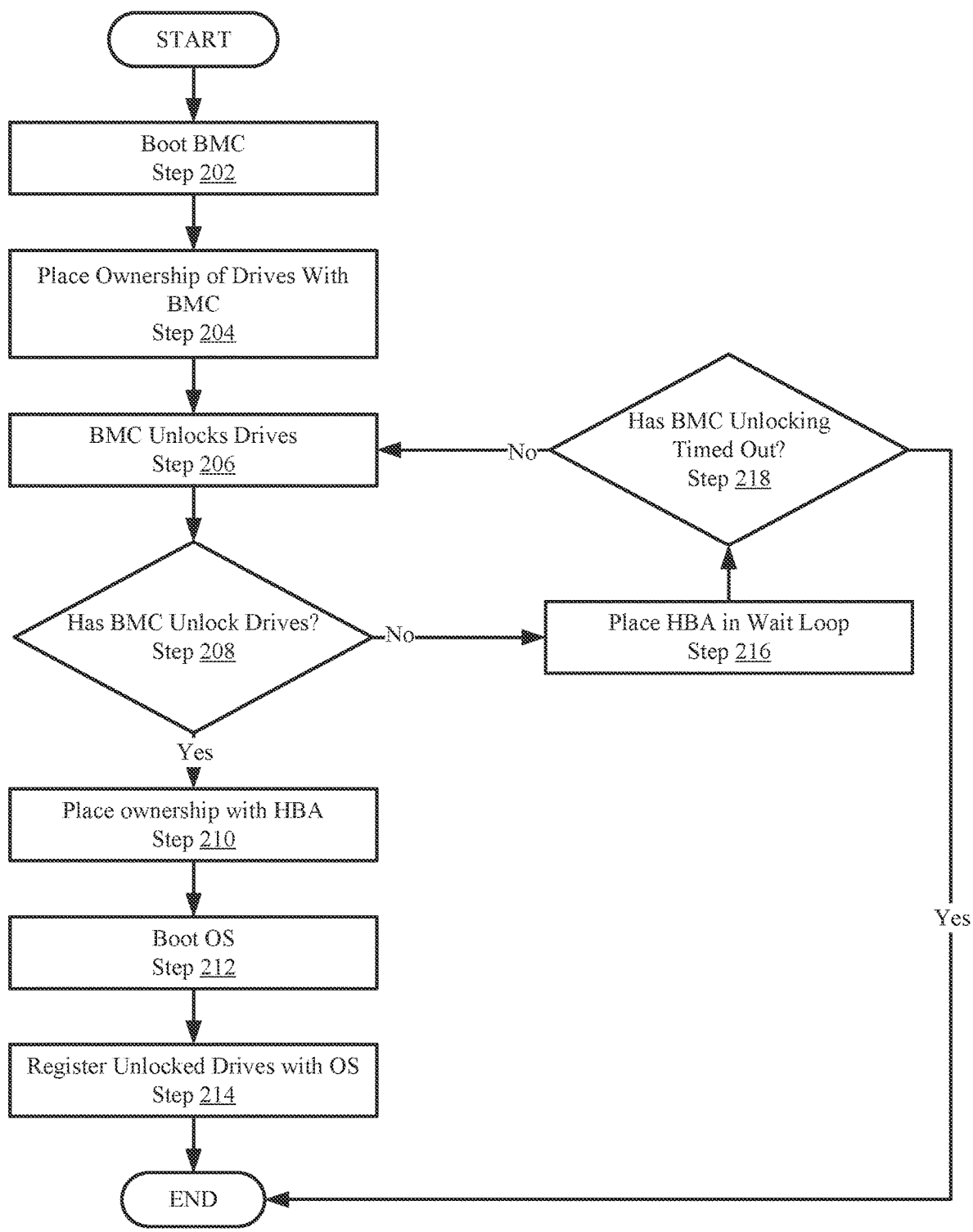
FIG. 2A shows a flowchart of a method for booting a device that includes one or more SEDs, in accordance with one or more embodiments of the invention.

FIG. 2A shows a flowchart of a method for initializing a security mode of a storage controller by a hardware resource manager in accordance with one or more embodiments of the invention. The method of FIG. 2A may be performed by, for example, the BMC (e.g., 110, FIG. 1). Other components of the system of FIG. 1 may perform all, or a portion, of the method of FIG. 2A without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 2A may be performed in parallel with any other steps shown in FIG. 2A-2C without departing from the scope of the invention.

Turning to FIG. 2A, in step 202, the BMC is booted. This may be the result of a system restart or may be based on a command from a user or administrator. In the case of a hot insertion of a drive, as will be described in more detail with the method of FIG. 2C, this step may be skipped, and the process proceeds to step 204. Once a command or power on is performed, the BMC is booted based on normal procedures for booting the BMC. At this point the OS for the system is not booted and only the BMC is booted. Other components of the system can be booted at the same time or before or after the BMC, without departing from the scope of the invention. Once the BMC is booted in step 202, the BMC determines that the system is operating in secure mode.

The method then proceeds to step 204 and any SED's or other drives have their ownership placed with the BMC. This is done by having the HBA install or begin to use UEFI protocols to communicate with the SEDs. Once the UEFI protocols or other related communication protocols are established between the HBA and SEDs (or other drives as appropriate), the HBA sets the drive ownership to the BMC and the HBA acts as a passthrough conduit between the SED and/or other drives, and the BMC.

Once ownership of the SEDs is with the BMC in step 204, the method proceeds to steps 206 and 208. In step 206 the BMC begins to unlock the SEDs and/or other drives. The BMC uses a key to unlock one or more SEDs or alternatively, uses multiple keys with each SED having its own key.

As discussed above, in one or more embodiments of the invention the BMC can obtain the key from a key management server. In one or more other embodiments of the invention the BMC can generate the keys locally and store the keys in a storage that is part of the BMC. Other methods of obtaining the keys to unlock the SEDs can be used, without departing from the scope of the invention. The BMC can also unlock other types of drives or place unsecured drives in either a locked or unlock list as appropriate. For additional details regarding the unlocking or securing of the storage devices (including the SEDS), see, e.g., FIG. 2B.

In step 208, the BMC determines if the SEDs or other drives have been successfully unlocked, if they have not the method proceeds to steps 216 and 218, where the HBA and/or a UEFI driver are placed in a busy wait loop and continue to act as a passthrough conduit between the SEDs or other drives, and the BMC. While the HBA and/or UEFI driver wait in the loop steps 206 and 208 repeat. The HBA and/or the UEFI driver wait in the wait loop for a pre-configured time (when the unlocking has timed out) or until the BMC unlocks the drives in step 208.

If the unlocking times out in step 218 by taking longer than the pre-configured time out value, then the method ends, and the user or administrator can be alerted that the boot has failed. Alternatively, where there are multiple drives, the system can leave the drives that unlocking timed out with, in a locked state, and proceed to boot the other drives that were successfully unlocked in step 208.

The time out value in step 218 is preconfigured. In one or more embodiments of the invention, it may be a manufacturer setting based on the performance of both the BMC and HBA in a particular system. Alternatively, it may be part of the configuration of the individual SEDs or other drives. In one or more embodiments of the invention the time out value in step 218 is set by an administrator or user of the system, during system set up.

Returning to step 208, if the BMC does successfully unlock the SEDs and/or other drives, the method proceeds to step 210. In step 210 the BMC places the ownership of the SEDs and/or other drives with the HBA and the BMC causes the OS to boot in step 212. This includes installing or booting the specific OS drivers for the SEDs. In one or more embodiments, where the OS has already booted, such as during a hot swap of a drive such as described in more detail with FIG. 2C below, step 212 can be skipped.

Once the OS has successfully booted in step 214, or if the OS was previously booted, the unlocked SEDs and/or other drives are registered with the OS in step 214 and the drives are placed with the OS Kernel. After the unlocked SEDs and/or other drives are registered with the OS, the method may end.

Figure 2B:
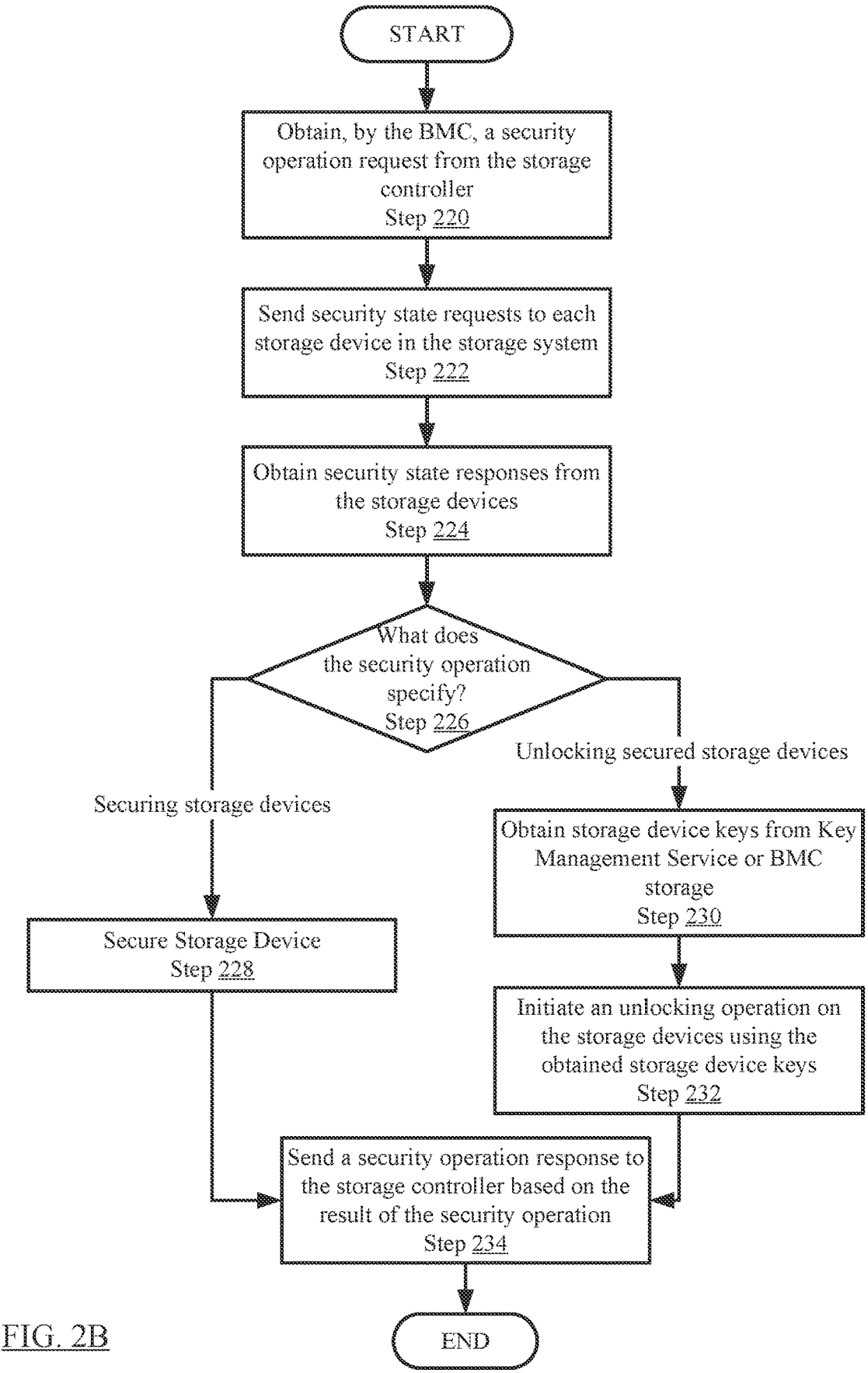
FIG. 2B shows a flowchart of a method for performing a security operation on a SED in accordance with one or more embodiments of the invention.

FIG. 2B shows a flowchart of a method for servicing security operation requests in accordance with one or more embodiments of the invention. The method of FIG. 2B may be performed by, for example, a BMC (110, FIG. 1). Alternatively, the method of FIG. 2B may be performed by the HBA (120). Other components of the system of FIG. 1 may perform all, or a portion, of the method of FIG. 2B without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 2B may be performed in parallel with any other steps shown in FIG. 2A-2C without departing from the scope of the invention.

In step 220, a security operation request is obtained by the BMC or by a similar component such as hardware manager. In one or more embodiments of the invention, the security operation request is obtained from a storage controller. The security operation request in one or more embodiments of the invention can be performing an unlocking operation on a storage device such as a SED. Other security operations requests can initiate step 220 without departing from the scope of the invention.

In step 222, security state requests are sent to each storage device in the storage system. In one or more embodiments of the invention, the security state requests specify identifying the security state of the storage devices. The security state requests may be forwarded to the storage devices via the HBA. In this manner, the HBA may serve as a pass-through component that forwards messages between the BMC and the storage devices.

In step 224, security state responses are obtained from the storage devices. The security state responses may specify the security states of the storage devices.

In step 226, a determination is made about what the security operation request specifies. If the security operation request specifies securing storage devices, the method proceeds to step 228; if the security operation request specifies unlocking secured storage devices, the method proceeds to step 230.

In step 228, following the determination that the security operation specifies securing unsecured storage devices, new storage devices keys are obtained for the unsecured storage devices and the unsecured storage devices are secured. In one or more embodiments of the invention, the securing includes performing an encryption algorithm on the data stored in the unsecured storage devices using the obtained new storage device keys. The new storage device keys are obtained from a key management service that generates the storage device keys. The key management service may generate the storage device keys for the unsecured storage devices identified in step 224 and store a data structure that tracks the storage device keys and the corresponding storage devices. Alternatively, such data structure may be provided to the hardware resource manager (not shown).

In step 230, following the determination that the security process specifies unlocking secured storage devices, previous storage device keys of the secured storage devices are obtained. In one or more embodiments of the invention, the storage device keys are obtained from the key management service managing the storage device keys of the secured storage devices. In one or more other embodiments of the invention, the keys are obtained from storage in the BMC. The secured storage devices may be those identified in step 224. In one or more embodiments of the invention, the storage device keys obtained in step 230 are used to decrypt data in a storage device.

In step 232, an unlocking operation is initiated for the storage devices using the obtained storage device keys. In one or more embodiments of the invention, the unlocking operation is initiated by sending the obtained storage device keys to the secured storage devices to be used for accessing the data. In this manner, the storage devices may be installed to the storage system.

In step 234, a security operation response is sent to the storage controller based on the result of the security operation. In one or more embodiments of the invention, the security operation response specifies the result of performing the security operation. The security operation may be the security operation performed on step 228. Alternatively, the security operation may be the security operation of steps 230 and 232.

Figure 2C:
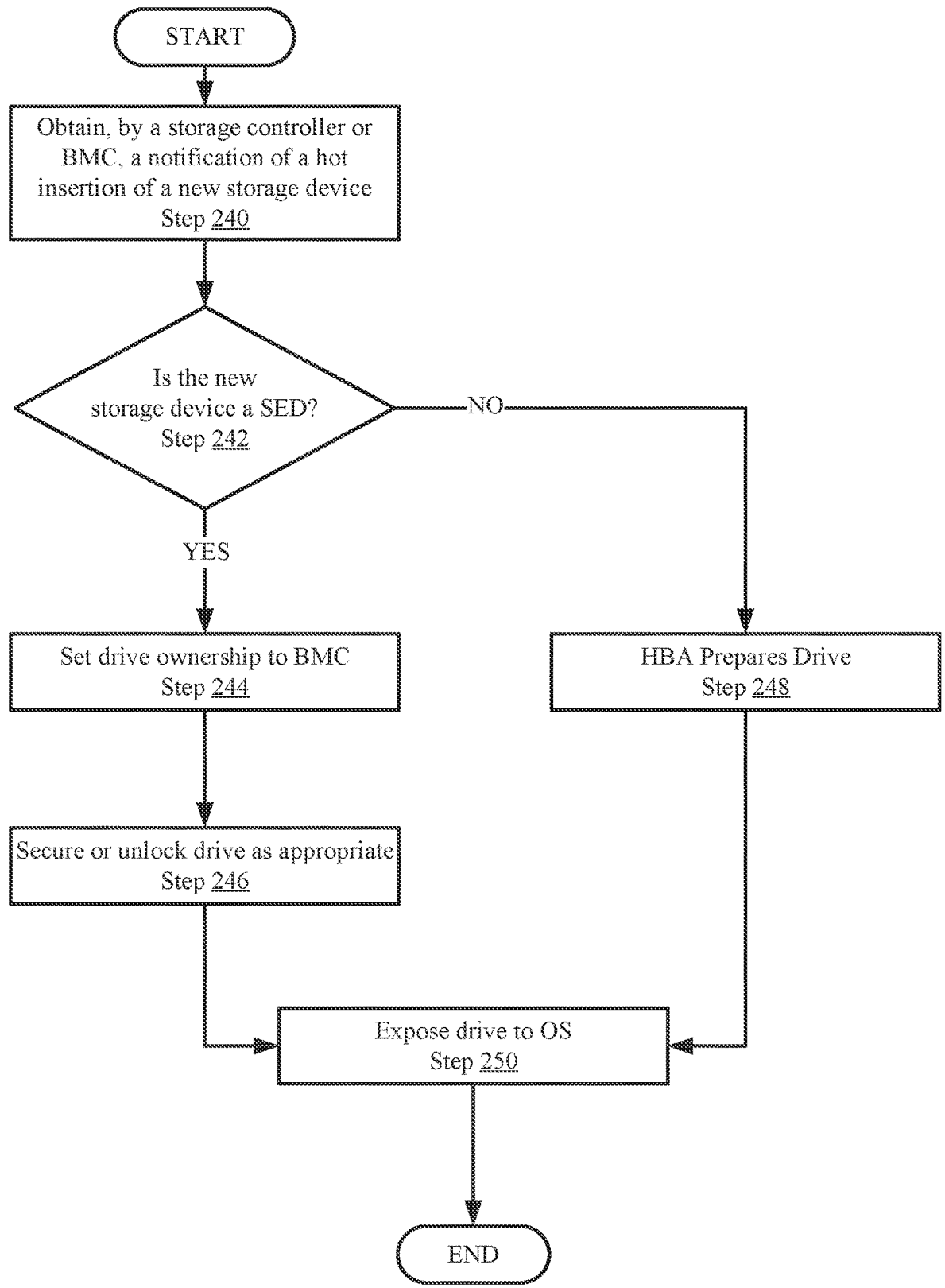
FIG. 2C shows a flowchart of a method for securing or unlocking a new storage device in accordance with one or more embodiments of the invention.

FIG. 2C shows a flowchart of a method for installing a new storage device in accordance with one or more embodiments of the invention. The method of FIG. 2C may be performed by, for example, a BMC (110, FIG. 1). Other components of the system of FIG. 1 may perform all, or a portion, of the method of FIG. 2C without departing from the invention.

While the various steps in the flowcharts are presented and described sequentially, one of ordinary skill in the relevant art will appreciate that some or all of the steps may be executed in different orders, may be combined, or omitted, and some or all steps may be executed in parallel. In one embodiment of the invention, the steps shown in FIG. 2C may be performed in parallel with any other steps shown in FIGS. 2A and 2B without departing from the scope of the invention.

In step 240, a notification is obtained by the BMC of a hot insertion of a new storage device such as a SED. In one or more embodiments of the invention, the notification is obtained from the storage device that notifies the BMC of the insertion. As discussed above, a hot insertion of a storage device may refer to updating the storage system to include the new storage device during operation of the storage controller.

In step 242, a determination is made about whether the storage device is an SED or other secured drive. If the storage device is a SED or other secured drive, the method proceeds to step 244; otherwise, the method proceeds to step 248.

In step 244, the drive ownership is set to the BMC. This is done by having the HBA install or begin to use UEFI protocols to communicate with the SEDs. Once the UEFI protocols or other related communication protocols are established between the HBA and SEDs (or other drives as appropriate), the HBA sets the drive ownership to the BMC and the HBA acts as a passthrough conduit between the SED and/or other drives, and the BMC.

In step 246, the BMC then secures or unlocks the SED as appropriate. The method of securing or unlocking the SED is described in more detail above with regards to FIG. 2B. Once a secure state response is obtained from the BMC that corresponds to the result of the unlocking operation. The response may specify whether the security operation was performed successfully by the BMC. If the response specifies a successful unlocking operation, the method may proceed as illustrated in FIG. 2C. In one or more embodiments of the invention, the security state response may include a storage device decryption key that may be used to initiate the unlocking operation. In such embodiments, the storage controller may initiate the unlocking using the obtained decryption key.

Once the BMC secures or unlocks the drive as appropriate in step 246, the method proceeds to step 250.

Returning to step 242, if the method determines that the storage device is not a SED, the method proceeds to step 248. In step 248 the HBA prepares the drive, in the manner specified by the HBA and drive manufacturer. Once the drive is prepared by the HBA, the method proceeds to step 250.

In step 250, the drive is exposed to the system OS and can then be used by users of the system. The method may end after step 250.

Figure 3:
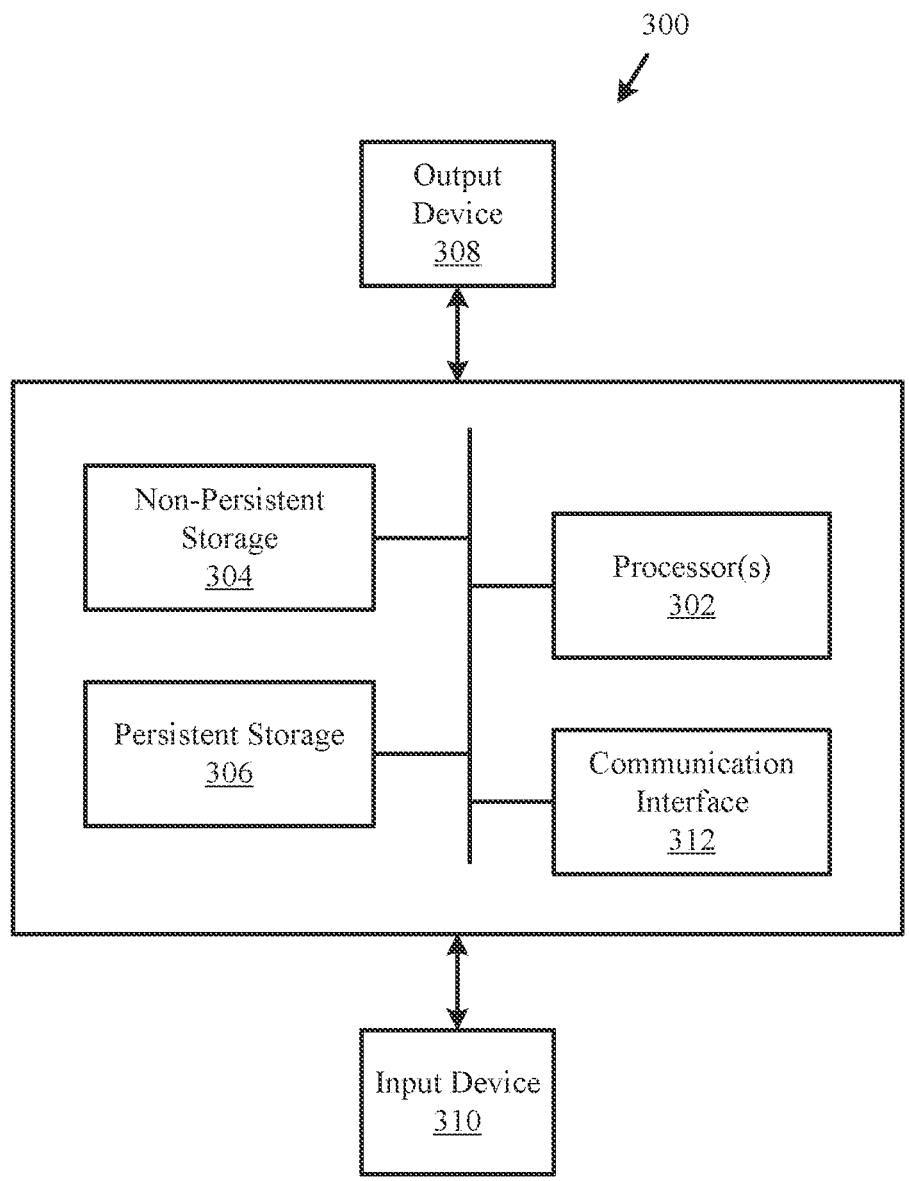
FIG. 3 shows a diagram of a computing device in accordance with one or more embodiments of the invention.

As discussed above, embodiments of the invention may be implemented using computing devices. FIG. 3 shows a diagram of a computing device in accordance with one or more embodiments of the invention. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the invention, the computing device (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of computing components in a storage system by offloading the security operations from a storage controller, which may have limited resources to provide the security operations, to a hardware resource manager. The hardware resource manager may provide methods of utilizing an external entity (e.g., a key management service) to generate and manage the storage of the keys.

Thus, embodiments of the invention may address the problem of HBA controllers not being able to completely manage and secure a self-encrypting drive (SED). Embodiments of the invention, have the BMC manage the security of the drives as well as the security life cycle of the SED, while the HBA mostly functions as a passthrough conduit.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for using a self-encrypting drive (SED), the method comprising:
    obtaining, by a baseboard management controller (BMC), a security operation request;
    sending security state requests to a set of storage devices in the computing device;
    obtaining security state responses from the set of storage devices;
    making a determination that the security operation request specifies one of a list consisting of: securing the set of storage devices, and unlocking the set of storage devices;
    identifying, in response to the determination that the security operation request specifies unlocking the set of storage devices, a drive on a computing device as a SED,
        wherein the set of storage devices comprises the drive, and
        wherein one of the security state responses indicates that the drive is in a secured state;
    unlocking, in response to the security operation request and based on the one of the secured state responses, the SED by the BMC,
        wherein the BMC is on the computing device; and
    registering, after the unlocking, the SED with an operating system executing on the computing device.

2. The method of claim 1, wherein the BMC unlocks the SED with a key from an external key management service.

3. The method of claim 1, wherein the BMC includes local storage that includes at least one key for unlocking the SED.

4. The method of claim 1, wherein a host bus adapter (HBA) connects the BMC to the SED.

5. The method of claim 4, wherein during the unlocking of the SED, the HBA acts as a passthrough conduit between the SED and BMC.

6. The method of claim 1, wherein the identifying is performed when the computing device is powered on.

7. The method of claim 1, wherein the operating system is not started until after the BMC unlocks the SED.

8. The method of claim 1, wherein the identifying is performed when a hot insertion of the drive is detected.

9. A system comprising:
    a computing device;
    a set of storage devices comprising a self-encrypting drive (SED); and
    a baseboard management controller (BMC) that comprises of:
        at least one processor; and
        at least one memory that includes instructions, which when executed by the at least one processor, perform a method for using the SED comprising:
            obtaining a security operation request;
            sending security state requests to the set of storage devices in the computing device;
            obtaining security state responses from the set of storage devices;

making a determination that the security operation request specifies one of a list consisting of: securing the set of storage devices, and unlocking the set of storage devices;

identifying, in response to the determination that the security operation request specifies unlocking the set of storage devices, the drive as a SED, wherein one of the security state responses indicates that the SED is in a secured state;

unlocking, in response to the security operation request and based on the one of the security state responses, the SED by the baseboard management controller (BMC), wherein the BMC is on the computing device; and registering, based on the unlocking, the SED with an operating system executing on the computing device.

10. The system of claim 9, wherein the BMC unlocks the SED with a key from an external key management service.

11. The system of claim 9, wherein the BMC includes local storage that includes at least a key for unlocking the SED.

12. The system of claim 9, wherein a host bus adapter (HBA) connects the BMC to the SED.

13. The system of claim 12, wherein during the unlocking of the SED, the HBA acts as a passthrough conduit between the SED and BMC.

14. The system of claim 9, wherein the operating system is not started until after the BMC unlocks the SED.

15. A non-transitory computer readable medium comprising computer readable program code, which when executed by a computer processor enables the computer processor to perform a method for using a self-encrypting drive (SED), the method comprising:

obtaining, by a baseboard management controller (BMC), a security operation request;

sending security state requests to a set of storage devices in the computing device;

obtaining security state responses from the set of storage devices;

making a determination that the security operation request specifies one of a list consisting of: securing the set of storage devices, and unlocking the set of storage devices;

identifying, in response to the determination that the security operation request specifies unlocking the set of storage devices, a drive on a computing device as a SED, wherein the set of storage devices comprises the drive, and wherein one of the security state responses indicates that the drive is in a secured state;

unlocking, in response to the security operation request and based on the one of the secured state responses, the SED by a baseboard management controller (BMC), wherein the BMC is on the computing device; and registering, based on the unlocking, the SED with an operating system executing on the computing device.

16. The non-transitory computer readable medium of claim 15, wherein the BMC unlocks the SED with a key from an external key management service.

17. The non-transitory computer readable medium of claim 15, wherein the BMC includes local storage that includes at least a key for unlocking the SED.

18. The non-transitory computer readable medium of claim 15, wherein a host bus adapter (HBA) connects the BMC to the SED.

19. The non-transitory computer readable medium of claim 18, wherein during the unlocking of the SED, the HBA acts as a passthrough conduit between the SED and BMC.

20. The non-transitory computer readable medium of claim 15, wherein the operating system is not started until after the BMC unlocks the SED.

* * * * *